United States Patent
Hrdlichka et al.

(10) Patent No.: US 9,657,844 B2
(45) Date of Patent: May 23, 2017

(54) HIGH TEMPERATURE ALUMINUM VALVE COMPONENTS

(75) Inventors: Aaron Hrdlichka, Morristown, NJ (US); Robbie Joseph Adams, Morristown, NJ (US); Rich Hopkins, Morristown, NJ (US); Eric Holtz, Morristown, NJ (US); Steve Patterson, Morristown, NJ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 1387 days.

(21) Appl. No.: 13/440,776

(22) Filed: Apr. 5, 2012

(65) Prior Publication Data

US 2015/0369372 A1 Dec. 24, 2015

Related U.S. Application Data

(60) Provisional application No. 61/534,596, filed on Sep. 14, 2011.

(51) Int. Cl.

| F16K 1/32 | (2006.01) |
|---|---|
| F16K 31/42 | (2006.01) |
| F01D 25/02 | (2006.01) |
| F02C 7/24 | (2006.01) |
| F02C 9/18 | (2006.01) |
| F16K 31/12 | (2006.01) |

(52) U.S. Cl.
CPC .............. *F16K 1/32* (2013.01); *F01D 25/02* (2013.01); *F02C 7/24* (2013.01); *F02C 9/18* (2013.01); *F16K 31/12* (2013.01); *F16K 31/42* (2013.01); *F05D 2270/112* (2013.01); *F05D 2300/121* (2013.01); *F05D 2300/173* (2013.01); *Y02T 50/672* (2013.01); *Y10T 137/6416* (2015.04); *Y10T 137/6525* (2015.04)

(58) Field of Classification Search
CPC combination set(s) only.
See application file for complete search history.

(56) References Cited

U.S. PATENT DOCUMENTS

| 2,551,697 | A | * | 5/1951 | Palmatier | B64D 15/02 |
|---|---|---|---|---|---|
| | | | | | 137/505.12 |
| 2,861,774 | A | * | 11/1958 | Buchi | F01D 17/14 |
| | | | | | 415/150 |
| 3,258,229 | A | * | 6/1966 | Larson | B64D 15/02 |
| | | | | | 244/134 R |
| 3,749,336 | A | | 7/1973 | Christensen et al. | |
| 3,857,406 | A | * | 12/1974 | Dorling | F16K 1/22 |
| | | | | | 137/15.25 |
| 3,865,128 | A | * | 2/1975 | Zadoo | G05D 16/106 |
| | | | | | 137/220 |
| 4,320,872 | A | * | 3/1982 | Frederick | G05D 23/185 |
| | | | | | 165/256 |
| 4,403,538 | A | * | 9/1983 | Rise | F02B 37/186 |
| | | | | | 60/602 |

(Continued)

*Primary Examiner* — Kevin Murphy
*Assistant Examiner* — Jonathan Waddy
(74) *Attorney, Agent, or Firm* — Lorenz & Kopf, LLP

(57) ABSTRACT

A valve unit for an aircraft is provided. The valve unit includes valve assembly; and a servo controller coupled to the valve assembly and configured to control operation of the valve assembly. At least a portion of at least one of the valve assembly or servo controller is formed by a high temperature aluminum alloy.

10 Claims, 5 Drawing Sheets

(56) References Cited

U.S. PATENT DOCUMENTS

| | | | |
|---|---|---|---|
| 4,573,661 A * | 3/1986 | Chapman | F16K 31/163 251/14 |
| 4,582,466 A * | 4/1986 | Szczupak | F01D 17/143 415/150 |
| 4,647,321 A | 3/1987 | Adam | |
| 4,655,040 A * | 4/1987 | Parker | F02B 37/183 251/25 |
| 4,715,893 A | 12/1987 | Skinner et al. | |
| 4,729,790 A | 3/1988 | Skinner | |
| 4,747,748 A * | 5/1988 | Sahlberg | F01D 1/04 415/169.2 |
| 4,775,117 A | 10/1988 | Standke | |
| 4,828,632 A | 5/1989 | Adam et al. | |
| 4,869,751 A | 9/1989 | Zedalis et al. | |
| 5,296,190 A | 3/1994 | Premkumar | |
| 5,332,455 A | 7/1994 | Chang et al. | |
| 5,540,252 A * | 7/1996 | Bruun | G05D 7/0146 137/220 |
| 6,446,657 B1 | 9/2002 | Dziorny et al. | |
| 7,000,425 B2 | 2/2006 | Army Jr. et al. | |
| 7,669,830 B2 * | 3/2010 | Franconi | F16K 31/1225 251/28 |
| 7,909,261 B2 | 3/2011 | Ellstrom et al. | |
| 2004/0156739 A1 | 8/2004 | Song | |
| 2008/0219882 A1 | 9/2008 | Woydt | |
| 2009/0078828 A1 | 3/2009 | Sugai et al. | |
| 2010/0077825 A1 | 4/2010 | Chipko et al. | |
| 2014/0109978 A1 * | 4/2014 | Simpson | B64D 13/02 137/12 |

* cited by examiner

HIGH TEMPERATURE ALUMINUM VALVE COMPONENTS

PRIORITY CLAIM

This application claims the benefit of U.S. Provisional Application No. 61/534,596, filed Sep. 14, 2011, the entirety of which is hereby incorporated by reference.

TECHNICAL FIELD

The inventive subject matter generally relates to valve components, and more particularly relates to valve components with improved thermal characteristics.

BACKGROUND

A gas turbine engine may be used to power various types of vehicles and systems. A particular type of gas turbine engine that may be used to power aircraft is a turbofan gas turbine engine. A turbofan gas turbine engine may include, for example, a fan section, a compressor section, a combustor section, a turbine section, and an exhaust section. The fan section induces air from the surrounding environment into the engine and accelerates a fraction of the air toward the compressor section. The remaining fraction of air is accelerated into and through a bypass plenum, and out the exhaust section. The compressor section, which may include high pressure compressors and low pressure compressors, raises the pressure of the air it receives from the fan section to a relatively high level.

Compressed air leaving the compressor section then enters the combustor section, where a ring of fuel nozzles injects a steady stream of fuel into a plenum. The injected fuel is ignited to produce highly-energized compressed air. The air then flows into and through the turbine section, causing turbine blades therein to rotate and generate mechanical energy. The air exiting the turbine section is exhausted from the engine via the exhaust section, and the energy remaining in the exhaust air aids the thrust generated by the air flowing through the bypass plenum.

Another portion of the compressed air may be directed from the compressor into a bleed port. The bleed port may be used to bleed the air to other components, such as to an anti-ice valve unit, which may operate by using the bleed air. An anti-ice valve unit includes groups of components used to de-ice aircraft surfaces, such as aircraft wings, and typically include at least a valve body and a valve element. A flowpath for the bleed air extends through the valve body, and the valve element is disposed in the flowpath. The valve element may be coupled to a pneumatic servo controller that regulates the pressure of the bleed air through the flowpath. In this regard, the pneumatic servo controller receives a portion of the bleed air from one or more tubes that communicate with the flowpath.

Although the aforementioned anti-ice valve units operate sufficiently in existing engines, they may be improved. In particular, because the bleed air from the compressor may be relatively high in temperature, certain parts of the anti-ice valve unit should be designed to accommodate such high temperatures without deleterious effects.

Accordingly, it is desirable to have components of valve units that may have a relatively long service life, even when repeatedly exposed to high temperatures. In addition, it is desirable for the valve components to remain relatively lightweight and to have a similar or smaller footprint than existing valve components. Furthermore, other desirable features and characteristics of the inventive subject matter will become apparent from the subsequent detailed description of the inventive subject matter and the appended claims, taken in conjunction with the accompanying drawings and this background of the inventive subject matter

BRIEF SUMMARY

In accordance with an exemplary embodiment, a valve unit for an aircraft is provided. The valve unit includes valve assembly; and a servo controller coupled to the valve assembly and configured to control operation of the valve assembly. At least a portion of at least one of the valve assembly or servo controller is formed by a high temperature aluminum alloy.

In accordance with another exemplary embodiment, a valve unit is provided for modulating bleed air from an aircraft engine. The valve unit includes a valve assembly defining a flow body for the bleed air; and a servo controller coupled to the valve assembly and configured to at least partially pneumatically control operation of the valve assembly with a portion of the bleed air; and a heat exchanger coupled to the servo controller and the valve assembly. The heat exchanger is configured to receive the portion of the bleed air from the valve assembly, to provide the portion of the bleed air to the servo controller, and to remove heat from the portion of the bleed air.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
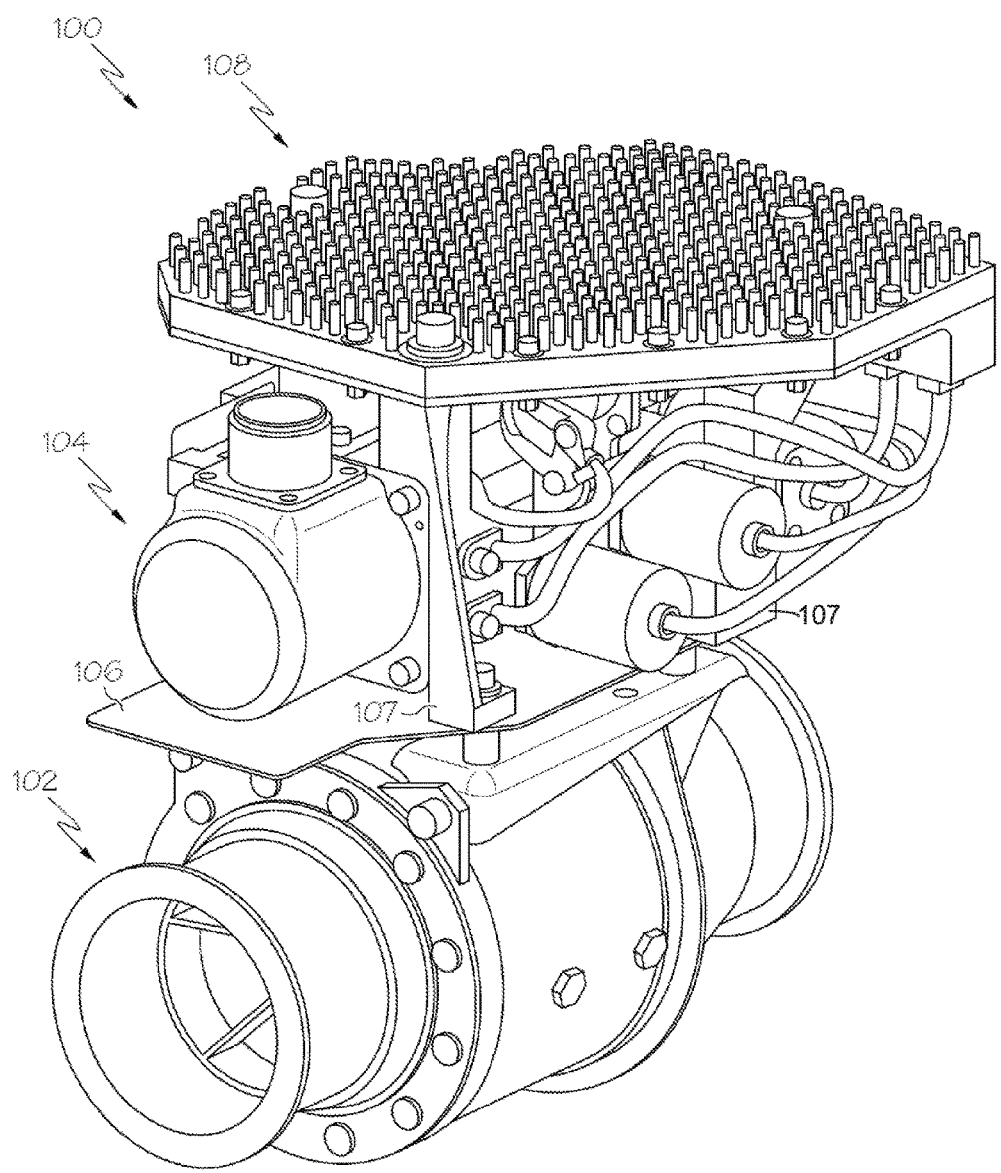
FIG. 1 is an isometric view of a valve unit according to an exemplary embodiment.
Figure 2:
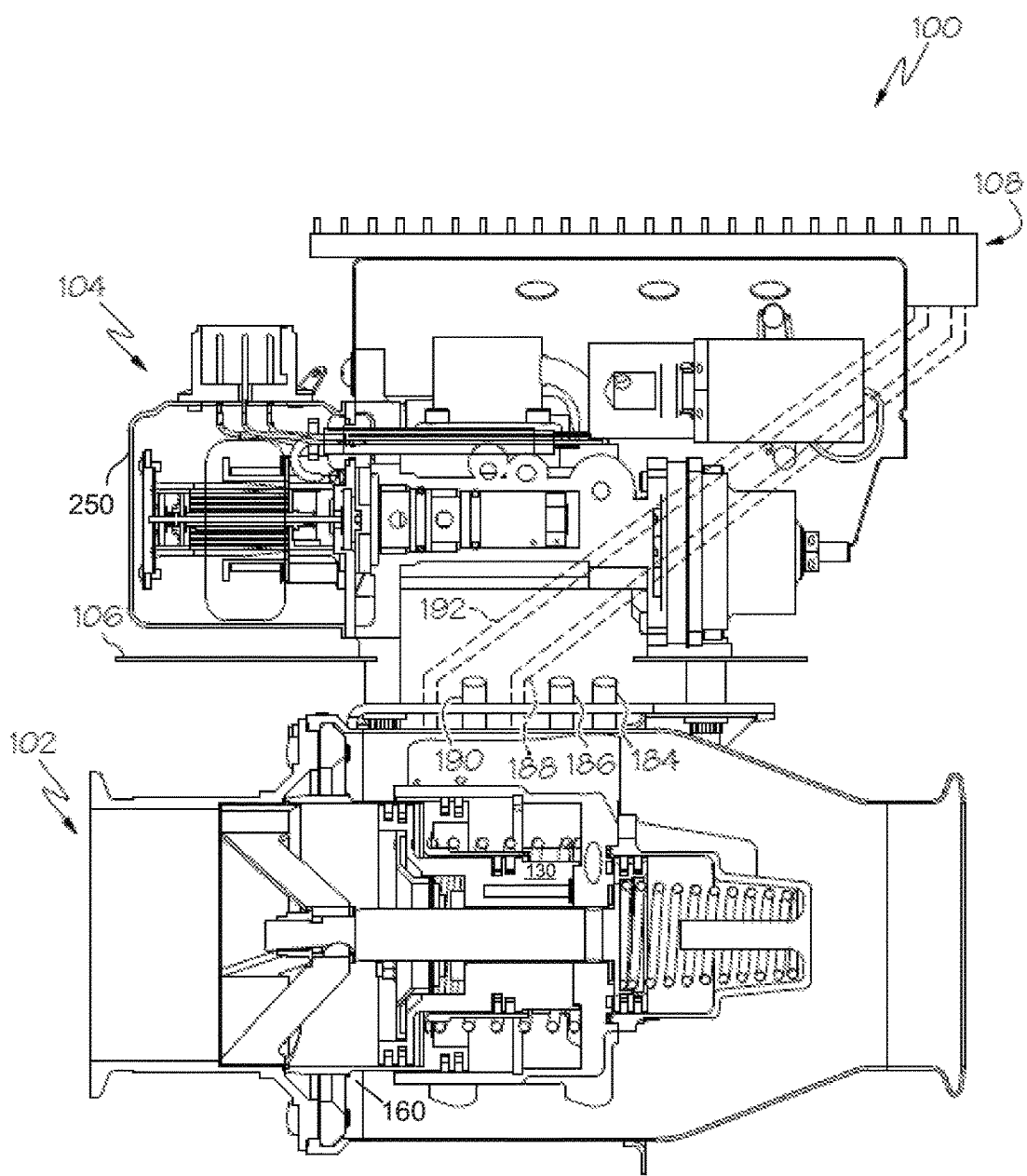
FIG. 2 is a partial cutaway view of the valve unit of FIG. 1 according to an exemplary embodiment.

FIG. 1 is an isometric view of a valve unit 100, and FIG. 2 is a partial cutaway view of the valve unit 100 according to an exemplary embodiment. The unit 100 may be used in an aircraft de-icing system that directs bleed air from a compressor (not shown) to portions of an aircraft for use in a de-icing process. In an embodiment, the unit 100 may be configured to ensure that a suitable amount of the bleed air is supplied to the de-icing system and that the supplied bleed air is suitably pressurized. In this regard, the unit 100 includes a valve assembly 102, a servo controller 104, and a heat exchanger 108. The valve assembly 102 may generally be referred to as an actuator, or more generally, a flowbody. In an embodiment, the valve assembly 102 and the servo controller 104 are spaced a predetermined distance apart from each other, and in some embodiments, may be separated from each other by a barrier 106, which may be a heat shield, a fire wall, or other type of thermal isolation device. In other embodiments, the barrier 106 may be omitted. In one exemplary embodiment, the heat exchanger 108 is mounted on the servo controller 104 to form a single, integrated valve unit 100. As an example, FIG. 1 illustrates the servo controller 104 and heat exchanger 108 mounted to the valve assembly 102 with brackets 107. Attachment points for screws and other attachment mechanisms may be provided in the valve assembly 102, servo controller 104, and heat exchanger 108 for assembly.

As described below, portions of the valve unit 100 may be formed with a high temperature aluminum alloy, which provides improved mechanical strength properties given a relatively high thermal load, particularly as compared to other conventional aluminum alloys. Additionally, as described below, aspects about the exemplary embodiments discussed herein are also applicable to other types of valve components, including other types of servo components; butterfly plates and other components of butterfly valves; other types of pneumatic actuators, actuator covers, and actuator linkages; and other types of valve flow bodies. In the description below, the structure and operation of the valve unit 100 is described below prior to a more detailed description of the thermal and mechanical properties of the high temperature aluminum components.

Figure 3:
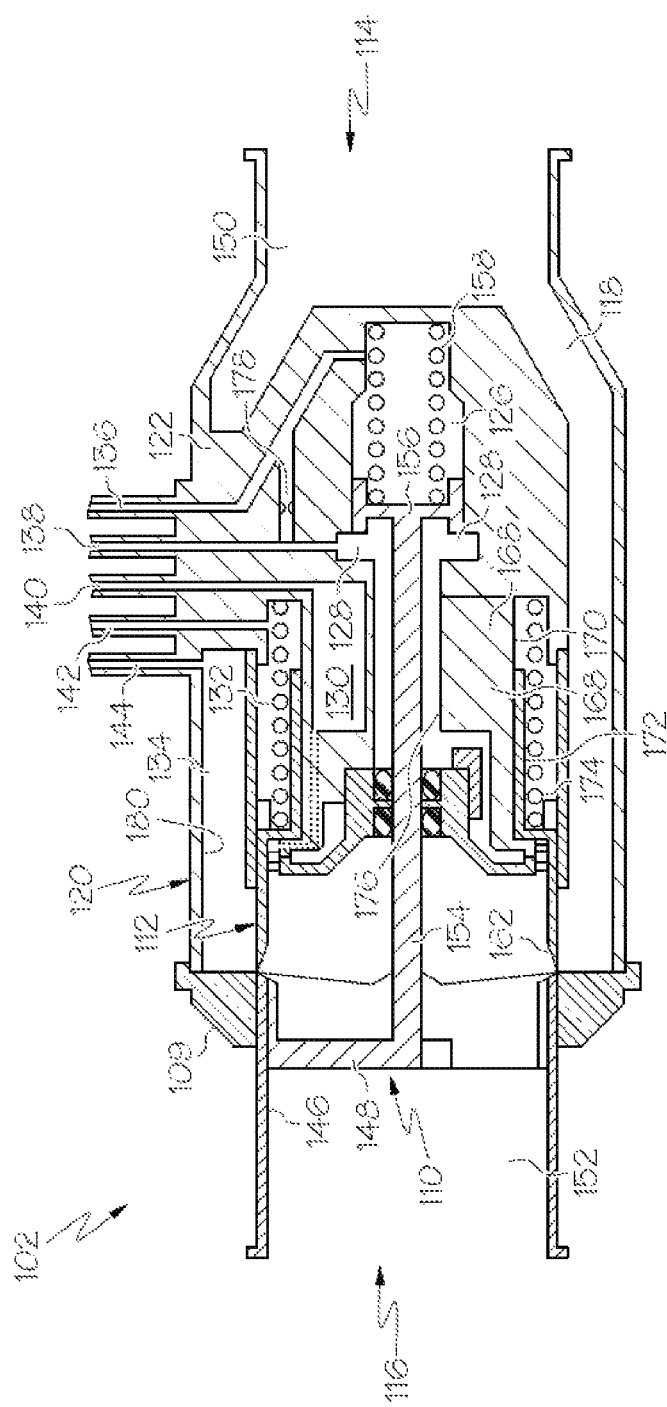
FIG. 3 is a cross-sectional view of a valve assembly of the valve unit shown in FIG. 1 according to an exemplary embodiment.

FIG. 3 is a cross-sectional view of a valve assembly 102 of the anti-ice valve unit shown in FIGS. 1 and 2 according to an exemplary embodiment. The valve assembly 102 is configured to receive the high temperature, pressurized bleed air from the compressor (not shown) before it is used for the de-icing process. In an embodiment, the valve assembly or actuator 102 includes a valve housing 109, a primary valve 110, and a secondary valve 112. The valve housing 109 includes an inlet 114, an outlet 116, and a primary flowpath 118 therebetween, and the primary valve 110 and secondary valve 112 are disposed in the primary flowpath 118. In an embodiment, a valve body 120 extends at least partially through the valve housing 109 to make up a portion of each of the primary and secondary valves 110, 112. The valve body 120 may include a block 122 within which a plurality of passages 136, 138, 140, 142, 144 are formed. In an embodiment, a portion of the block 122 may be coupled to or formed as part of the valve housing 109. In another embodiment, the valve housing 109 may have an opening that provides access to the block 122. The plurality of passages 136, 138, 140, 142, 144 may communicate with a plurality of chambers 126, 128, 130, 132, 134 formed by the valve body 120, the block 122, the valve housing 109, the primary valve 110, and the secondary valve 112. Although five chambers and five passages are depicted herein, fewer or more may alternatively be employed.

The primary valve 110 includes a valve element 148 that seats an inner surface 146 of the valve body 120. The valve element 148 divides the primary flowpath 118 into an upstream portion 150 and a downstream portion 152 and is configured to axially slide through the valve body 120. The primary valve 110 may regulate flow through the main flow path 118 by sliding over apertures 160. In an embodiment, the valve element 148 may be actuated, via a shaft 154, by a force created by air pressure and a spring 158 acting on a primary piston 156, described below. The primary piston 156 and spring 158 may be disposed in a first chamber 126 formed in the block 122. The first chamber 126 communicates with a first passage 136 that is also formed in the block 122.

The secondary valve 112 may include a valve flange 162 that is configured to slide axially through the valve body 120 and one or more openings through which the shaft 154 extends. The valve flange 162 may restrict passage of bleed air through the valve assembly 102 by sliding over the aperture 160 formed in the valve body 120 that opens or closes the second valve 112. The valve flange 162 engages a support structure 168 having an outer surface 170 that is in slidable contact with a second piston 172, which may actuate in response to air pressure and a spring 174. The support structure 168 also includes an inner surface 176 that defines a second chamber 128 with the valve body 120 and the first piston 156. The second chamber 128 communicates with a second passage 138, which may also communicate with the first passage 136 via an axial channel 178.

A third chamber 130 may be formed in the support structure 168, and may be configured to communicate with a third passage 140 in the block 122. The outer surface 170 of the support structure 168 and an inner surface of the valve block 122 may define a fourth chamber 132, which may communicate with a fourth passage 142 formed in the block 122. A fifth chamber 134 may be defined between the outer surface of the valve block 122 and an inner surface 180 of the valve housing 109 and may communicate with a fifth passage 144 formed in the block 122, as well as the inlet side of the main flow path 118.

Accordingly, the primary valve 110 and secondary valve 112 are actuated by various pneumatic pressures and spring forces within the valve assembly 102. For example, the primary valve 110 is actuated in the closed direction (e.g., to the right in FIG. 3) by the pressure ("P2") in second chamber 128 and in the open direction (e.g., to the left in FIG. 3) by the pressure ("P4") in the first chamber 126 and the spring force of spring 158. The secondary valve 112 is actuated in the open direction (e.g., to the right in FIG. 3) by the pressure ("PC") in the third chamber 130 and actuated in the closed direction (e.g., to the left in FIG. 3) by the pressure ("P5") in the fourth chamber 132 and the spring 174. Operation of the valve assembly 102 is described in greater detail below with reference to FIG. 4.

Figure 4:
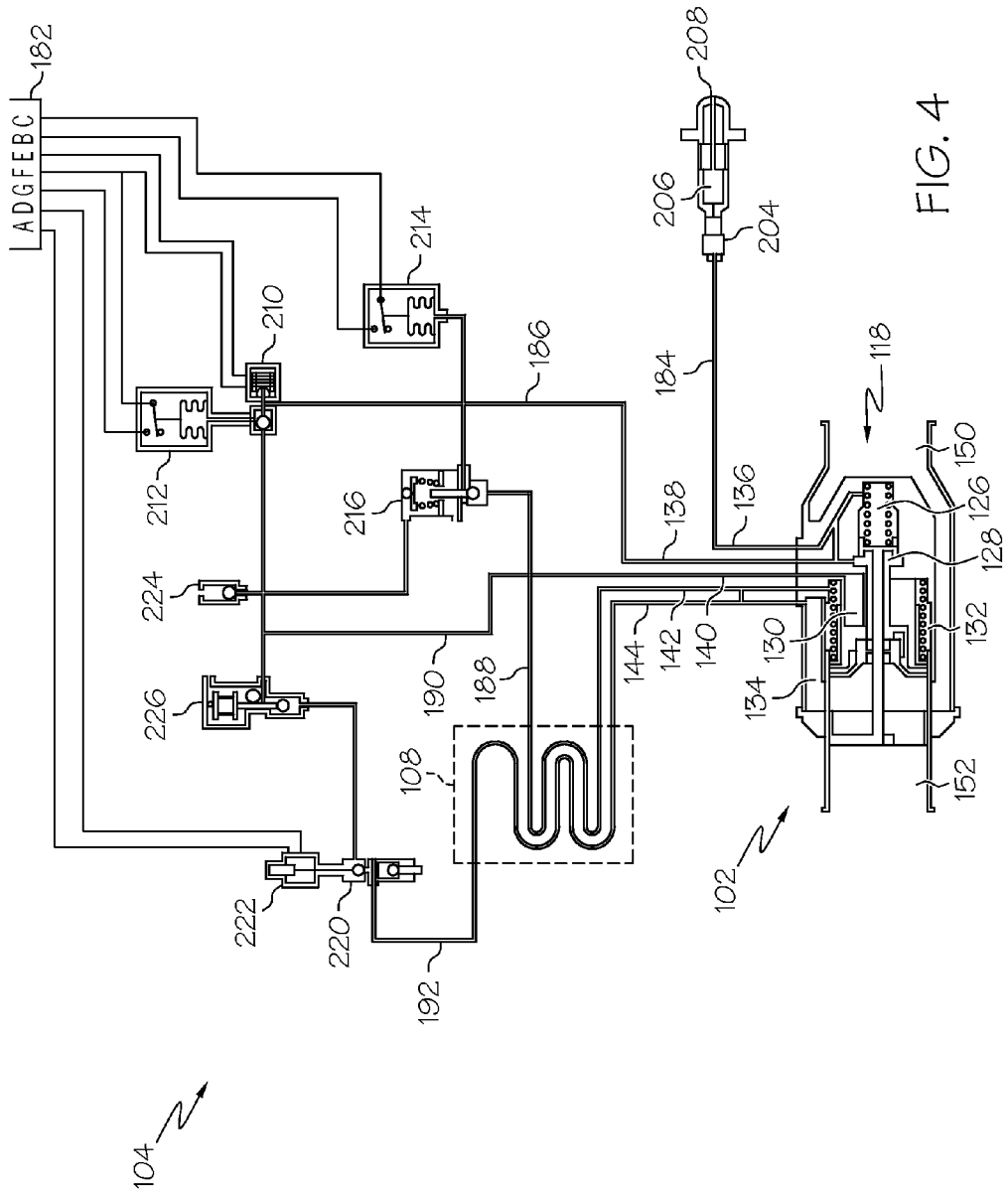
FIG. 4 is a simplified schematic for actuating the valve unit of FIG. 1 according to an exemplary embodiment.

FIG. 4 is a simplified schematic of the actuation of the valve unit 100 according to one embodiment and illustrates the operation of the valve assembly 102, servo controller 104, and heat exchanger 108. The servo controller 104 may operate pneumatically and may control the pressure of the bleed air from the passages 136, 138, 140, 142, 144 of the valve assembly 104 by comparing the pressures with acceptable predetermined threshold pressures to determine a differential, in an embodiment. Based on the differential, the servo controller 104 allows or restricts passage of the air between the upstream and downstream portions 150, 152 of the primary flowpath 118. In another embodiment, the servo controller 104 may additionally be configured to receive electrical command signals from a remote device, which may be provided to override actions by the servo controller 104 as a result of certain circumstances. For example, a user, such as a pilot, may input an override command to the remote device to shut off the servo controller 104, if anti-icing or de-icing is no longer needed.

The comparison of bleed air pressures may be performed via a plurality of solenoids, valves, and switches that are disposed along one or more lines 184, 186, 188, 190, 192. The lines 184, 186, 188, 190, 192 may be flexible or inflexible tubular structures, such as pipes, that may be used for air delivery. Referring also to FIG. 2, the solenoids, valves, switches, and lines 184, 186, 188, 190, 192 are housed within a servo housing 250. In an embodiment, the lines 184, 186, 188, 190, 192 communicate with the passages 136, 138, 140, 142, 144 to receive the bleed air therefrom. With continued reference to FIG. 4, in an embodiment, a first line 184 receives bleed air from the first chamber 126 and includes an end that terminates at a pilot regulator 204. The pilot regulator 204 may be used to adjust a pressure within the primary valve 110 of the valve assembly 102 and may include a temperature compensator 206. In an embodiment, the pilot regulator 204 may include an ambient vent 208 to allow a portion of the bleed air to be exhausted from the first line 184.

A second line 186 may receive bleed air from the second passage 138 and may communicate with a direct current (DC) solenoid 210 that is coupled to an overpressure switch 212. The DC solenoid 210 is configured to open or close the second line 186, in response to a pressure differential between the received bleed air (e.g., P2 in chamber 128) and a first predetermined threshold. The DC solenoid 210 also may be electrically coupled to a main controller (or connector) 182, which may deliver commands from a user to override actions of the DC solenoid 210. In one embodiment, the overpressure switch 212 may provide a signal to the main controller 182 indicating that the pressure (e.g., P2 in chamber 128) is higher than a second predetermined threshold. In another embodiment, the second line 186 also directs bleed air to a low pressure switch 214 that is electrically coupled to the main controller 182. The low pressure switch 214 is configured to provide a signal to the main controller 182 if a pressure (e.g., P2 in chamber 128) of the received bleed air is less than a third predetermined threshold. The second line 186 may also feed bleed air to a pneumatic switch 216.

A third line 190 receives bleed air from the fifth passage 144, a solenoid switcher 220, and a reference pressure regulator 226. This pressure is ported to the third chamber 130 to thereby actuate the second valve 112.

A fourth line 188 provides pressure from the second passage 138 and the second line 186 through the pneumatic switch 216. The pneumatic switch 216 may be set to a fourth predetermined threshold and thus, may open or close to thereby allow the bleed air to flow from the fourth line 188 depending on a differential between the fourth predetermined threshold and the pressure of the received bleed air (e.g., P2 in chamber 128). In some embodiments, the pneumatic switch 216 switches automatically from primary regulation to secondary regulation in an event that the pressure regulator 226 fails to open or the DC solenoid 210 is actuated.

The fifth line 192 provides pressure via the fifth passage 144 and may provide air to a balanced pressure valve 220 that is electrically coupled to an alternating current (AC) solenoid 222. The balanced pressure valve 220 is actuated open and closed with an electric signal from the main controller 182. When actuated, the balanced pressure valve 220 opens to allow the bleed air to flow to the fifth line 192. If the pressure in the fifth line 192 is above a fifth predetermined threshold, bleed air may be exhausted out a relief valve 224. A reference pressure regulator 226 may be included and is in fluid communication with the balanced pressure valve 220 to control the pressure of the bleed air in the third line 190 to a predetermined value.

It will be appreciated that one or more of the first, second, third, fourth, and fifth predetermined thresholds may or may not be equal to each other. Additionally, one or more of the thresholds may or may not be more or less than another one of the thresholds. Moreover, specific values for each threshold may depend on pressure values at which the bleed air may be suitable applied to the aircraft de-icing system.

As such, during operation, the valve component 100 includes a normally open primary modulating element (e.g., primary valve 110) and a normally closed secondary element (e.g., secondary valve 112). In this first condition, the valve inlet 114 is pressurized and the AC solenoid 222 and pneumatic switch 216 are closed. Air at the inlet pressure (PIN) (e.g., the pressure in the fifth chamber 134 and the inlet 150) flows through line 144 and through a restrictor to line 142 such that the inlet pressure (PIN) is equal to the pressure (P5) in the fourth chamber 132. As noted above, the pressure (P5) in the fourth chamber 132 hold the secondary valve 112 closed, thereby preventing the flow of air through the valve assembly 102.

In a second condition, the AC solenoid 222 is energized such that air at the inlet pressure (PIN) flows to the regulator 226, and air at the regulated pressure flows to the head of the pneumatic switch 216. When the pneumatic switch 216 switches, the pressure (P5) in the fourth chamber 132 is ported downstream, and the regulated pressure is ported to the third chamber 130 as regulated pressure (PC). As noted above, the pressure (PC) in the third chamber 130 acts against the pressure (P5) in the fourth chamber 132 and the spring 174 to open the secondary valve 112.

When the secondary valve 112 is open, air at the downstream pressure (PDS) enters the second chamber 128 at pressure (P2) and is ported into fourth chamber 132 at pressure (P5) via the pneumatic switch 216. Additionally, air at the downstream pressure (PDS) flows through a restrictor between lines 136 and 138 such that air at the downstream pressure (PDS) flows to the primary pilot regulator 206. The primary pilot regulator 206 regulates the pressure (P4) in the first chamber 126. As noted above, pressure (P4) and spring 158 in the first chamber 126 act upon the primary valve 110 to produce an opening force, while pressure (P2) in the second chamber 128 acts upon the primary valve 110 to produce a closing force.

When the downstream pressure (P2) in the second chamber 128 rises to produce a closing force equal to the opening force of pressure (P4) and spring 158 in the first chamber 126, the primary valve 110 is retracted to regulate the valve operation at apertures 160. If the primary valve 110 fails open, the downstream pressure (P5) in the fourth chamber 132 increases until the force of the pressure (P5) and spring 174 overcome the opening force of pressure (PC) in the third chamber 130, which is fluidly coupled to the chamber portion on the opposite side of the secondary valve 112 from the fourth chamber 132. The low pressure switch 214 indicates when the primary valve 110 is open, and the over pressure switch 212 indicates when the primary valve 110 is regulating high.

As mentioned above, the bleed air flowing between the valve assembly 102 and the servo controller 104 may be relatively high in temperature. Thus, to ensure the bleed air does not damage the components of the servo controller 104, at least some of the bleed air may be cooled prior to entering the servo controller 104. For example, as shown in FIG. 4, the lines 188 and 192 are initially directed through the heat exchanger 108 mounted on the valve assembly 102 prior to delivering the bleed air to the respective portion of the servo controller 104. The lines 188 and 192 may extend through the heat exchanger 108 in a serpentine pattern such that heat may be removed from the air flowing therethrough, e.g., air intended for the AC solenoid 222 and pneumatic switch 216. Fins, parallelepipeds, and/or raised diamonds may be formed on one or more surfaces of the heat exchanger 108 to facilitate heat removal. Although not shown, other lines (e.g., lines 184, 186, 190) may also be fluidly coupled to the heat exchanger 108 if necessary or desired.

In one exemplary embodiment, the heat exchanger 108 may reduce the temperature of the bleed air flowing through lines 188 and 192 from about 1000° F. or 1050° F. to about 400° F. or about 600° F., depending on the operating conditions and component requirements. In another exemplary embodiment, the heat exchanger 108 may reduce the temperature of the bleed air flowing through lines 188 and 192 from about 1000° F. or 1050° F. to about 360° F. or about 480° F., depending on the operating conditions and component requirements.

Figure 5:
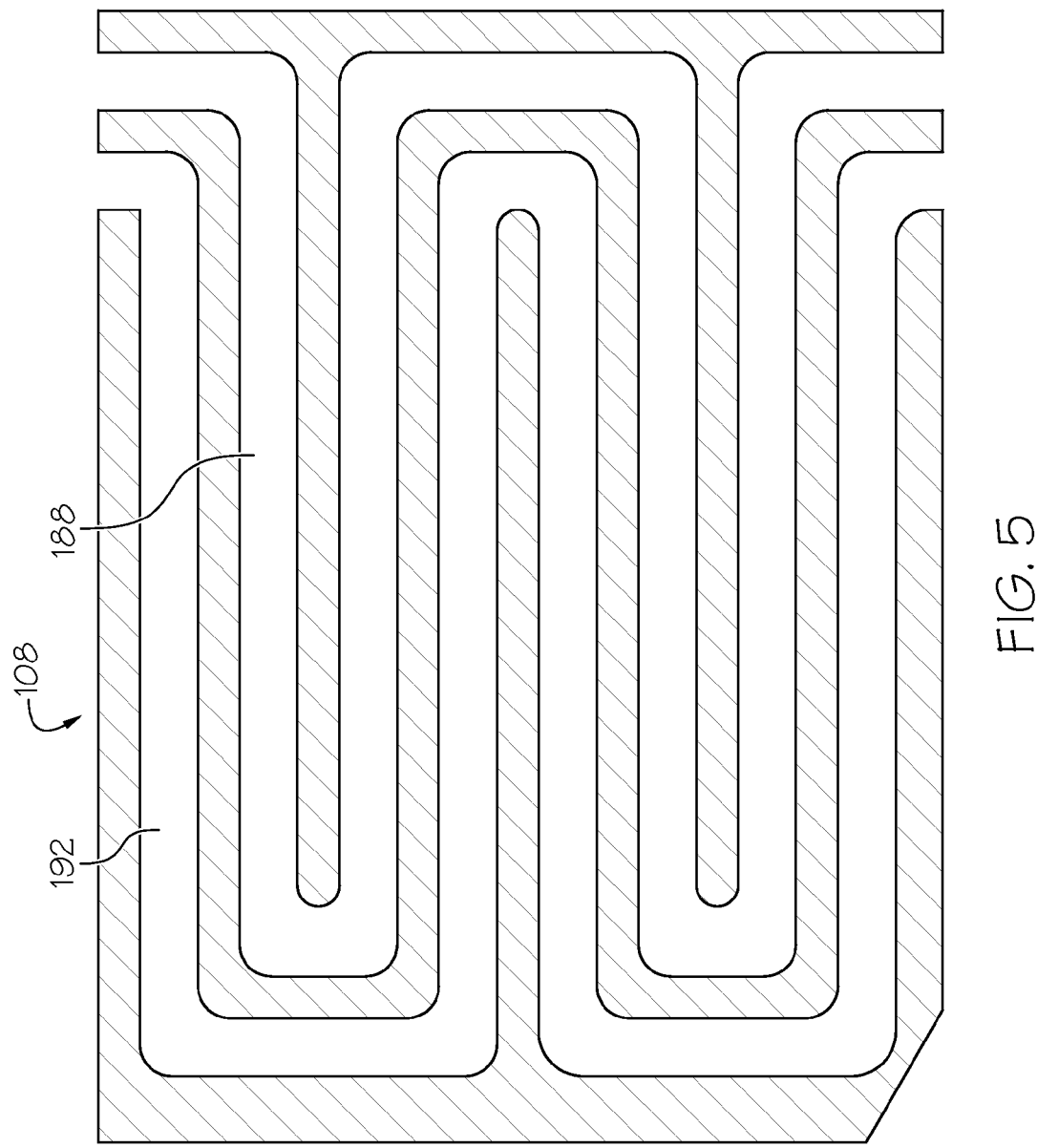
FIG. 5 is a cross-sectional view of a heat exchanger of the valve unit of FIG. 1 according to an exemplary embodiment.

A more detailed, cross-sectional view of the heat exchanger 108 is shown in FIG. 5. Within the heat exchanger 108, the lines 188 and 192 may be curved and/or serpentine to optimize heat removal from the bleed air flowing therethrough. The arrangement shown in FIG. 5 is merely exemplary and other arrangements are possible.

As an example, the heat exchanger 108 may prevent or mitigate thermal issues with respect to the electrical components and the O-rings and other elastomer components of the servo controller 104 resulting from heat flowing into the servo controller 104 via convection from the bleed air. The resulting temperatures may be, for example, about 80% of the temperature limits for the elastomer components of the servo controller 104. In one exemplary embodiment, the heat exchanger 108 reduces the temperature without interaction from remote components or systems, without forced air, within a limited space envelope, and in a robust manner.

As noted above, the valve assembly 102, servo controller 104, and/or heat exchanger 108 may be formed by a high temperature aluminum alloy, which is referenced below as "HT aluminum." For example, with respect to the valve assembly 102, the valve housing 109, primary valve 110, secondary valve 112, block 122, and/or other components may be formed from HT aluminum using the techniques described below. Similarly the body of the heat exchanger 108 and/or the components of the servo controller 104 may be formed from HT aluminum.

In one exemplary embodiment, the HT aluminum material used in the valve unit 100 is rapidly solidified aluminum, which is referred to below as "RS aluminum" or "AA8009" (or RSP8009 or FVS0812). Additional information about HT aluminum, particularly RS aluminum, is provided below. However, in general, HT aluminum generally has mechanical properties comparable to aluminum alloys in many applications, and high temperature mechanical strength degradation properties comparable to titanium alloys, thereby providing a low-density material with mechanical degradation properties comparable to titanium alloys. As such, although particular types of HT aluminum materials are discussed below, such as RS aluminum, HT aluminum may be defined as a high temperature aluminum alloy that maintains mechanical strength properties at temperatures of 400° F. or greater for time periods of 10,000 hours or greater.

As described above, aspects about the exemplary embodiments discussed herein are also applicable to other types of valve components, including other types of servo components; butterfly plates and other components of butterfly valves; other types of pneumatic actuators, actuator covers, and actuator linkages; and other types of valve flow bodies. In particular, HT aluminum may be used to fabricate these components to provide improved weight and durability characteristics, as well as load bearing and handling robustness and corrosion resistance. Particularly, the HT aluminum provides surprising durability in high temperature environments. For example, as introduced above, the HT aluminum components may operate at temperatures of about 450° F. to about 800° F. (and greater) for extended periods of time and maintain its mechanical strength properties comparable to titanium alloys, such as for 10,000 hours or more. For example, in some environments, HT aluminum components may operate for extended periods of time without mechanical degradation at temperatures of up to 1100° F. In these types of environments, the HT aluminum may replace steel to provide significant weight savings. It was previously believed that aluminum alloys were unsuitable for valve components in high temperature environments of aircraft engines. For example, aluminum alloys are generally not used as a load bearing material in parts that are expected to operate above approximately 350° F. As such, the HT aluminum may replace steel, titanium, and nickel alloys in moderately mechanically stressed aircraft engine components, particularly valve components.

The weight savings is advantageous in any component of the valve unit 100, but the weight and thermal properties of HT aluminum are particularly advantageous with respect to the heat exchanger 108. The heat exchanger 108 provides the desired cooling for a portion of the bleed air flowing through the servo controller 104 without adding undue weight to the unit 100 and/or stresses on the servo controller 104 and/or the valve assembly 102. If the heat exchanger is comprised of a higher density material, the overhung weight of the component as well as the center of gravity of the unit 100 would be further from the valve assembly 102, thereby resulting in larger moments on the valve assembly 102. In addition to the heat exchanger 108, the servo controller 104 may also be manufactured with HT aluminum, further reducing the weight and stress on the valve assembly 102.

In some instances, HT aluminum may have anisotropic structural properties. HT aluminum is particularly advantageous in applications such as the heat exchanger 108 and servo controller 104 because of the stresses in an elongation direction are relatively low, thereby mitigating the impact of any anisotropic characteristics of the material.

As noted above, the HT aluminum material used to manufacture portions of the unit 100 may be an RS aluminum material. Generally, RS aluminum is a rapidly solidified, powder/flake metallurgy, aluminum-iron-vanadium-silicon alloy that produces a composite material with very fine, nearly spherical silicide dispersoids uniformly distributed within an aluminum matrix. The silicides of RS aluminum are stable, both thermally and chemically, providing the alloy its outstanding physical integrity at elevated temperatures and corrosion resistance. The spheroids of RS aluminum exhibit good ductility, fracture toughness and fatigue resistance. RS aluminum is a naturally corrosion resistant material, thus resulting in uses without having to be anodized, thereby eliminating one more barrier for thermal conductivity and a crack initiation source. Additionally, the thermal stability of RS aluminum allows it to be brazed at a much higher temperature than standard aluminums without drastically degrading the material.

Additional details about RS aluminum are provided in the discussion below. RS aluminum alloys used in exemplary embodiments may include melting, followed by rapid solidification powder production, followed by degassing, followed by compaction under vacuum, followed by extrusion secondary forming, followed by rolling or forging. One embodiment includes RS aluminum formed by a dispersion strengthened aluminum alloy to a shaped part, including the steps of: (a) extruding or upsetting the alloy to produce stock; and (b) impact forging the stock with a steam hammer, an impact press, or a high energy rate forming press to produce shock waves within the stock.

More specifically, this may be a process for forming a rapidly solidified, dispersion strengthened aluminum alloy powder to a shaped part comprising the steps of: (a) extruding a billet made from said powder at an extrusion ratio of at least 4:1 to produce an extrudate; and (b) impact forging the extrudate using a plurality of dies to produce shock waves and high strain rates therewithin. The impact forging step may be carried out, for instance, using a steam hammer, an impact press, or a high energy rate forming press. The impact forging step is typically carried out at a temperature of at least 275° C., generally at a temperature in the range from about 275° C. to 450° C. The stock as forged in step (b) typically has at least 95% of the strength of the stock extruded in step (a). The stock of the dispersion strengthened alloy forged as described herein normally has dispersoids that are near spherical in shape. By "near spherical in shape," the dispersoids are closer in shape to spheres than to rods. That is, they are rounded rather than elongate. The dispersion strengthened alloy generally comprises from 5 to 45 volume-% dispersoids. The dispersion strengthened alloy may have a composition described by the formula Albal, Fea,SibXc, wherein X is at least one element selected from the group consisting of Mn, V, Cr, Mo, W, Nb, and Ta, "a" ranges from 2.0 to 9 weight-%, "b" ranges from 0.5 to 3.0 weight-%, "c" ranges from 0.05 to 3.5 weight-%, and the balance is aluminum plus incidental impurities, with the proviso that the ratio [Fe+X]: Si is within the range of from about 2:1 to about 5:1. Alternatively, the composition of the dispersion strengthened alloy may be described by the formula Albal,Fea,SibVdXc, wherein X is at least one element selected from the group consisting of Mn, Mo, W, Cr, Ta, Zr, Ce, Er, Sc, Nd, Yb, and Y, "a" ranges from 2.0 to 9 weight-%, "b" ranges from 0.5 to 3.0 weight-%, "d" ranges from 0.05 to 3.5 weight-%, "c" ranges from 0.02 to 1.50 weight-%, and the balance is aluminum plus incidental impurities, with the proviso that the ratio [Fe+X]:Si is within the range of from about 2:1 to about 5:1. Other formulations may be provided.

The alloys are preferably based on Al—Fe—V—Si. In accordance with this embodiment, the dispersoid may be a fine, nearly spherical Al12(FeV)3Si phase formed by decomposition of the rapidly solidified aluminum. This silicide dispersoid may make up from 5 to 45 volume-% of the alloy, preferably from 15 to 40 volume-%. This gives a range of alloy compositions all having a [Fe+V]:Si ratio within the range 2:1 to 5:1. These Al—Fe—V—Si alloys may contain from 0.02 to 0.5 wt-% of a fifth element, which may be Mn, Mo, W, Cr, Ta, Zr, Ce, Er, Sc, Nd, Yb, or Y.

In use, the high volume fraction alloys may be employed in applications that take advantage of their high stiffness, while the low volume fraction alloys have lower strength, and are easily formed into such products as rivets, etc., in which their lower strength, especially their high temperature strength, is sufficient.

To obtain the desired combination of strength and toughness the alloys appointed for use in these applications are rapidly solidified from the melt at cooling rates sufficient to produce a fine microstructure and intermetallic dispersoid. The quench rate from the molten state is preferably in the range of $1\times10^5$ ° C./sec to $1\times10^7$ ° C.; and is achieved by quenching techniques such as melt spinning, splat cooling or planar flow casting.

Quenching techniques such as melt spinning or planar flow casting produce a product having the form of a thin ribbon, which may thereafter be broken up to form a powder. This is readily achieved using a comminution device such as a pulverizer, knife mill, rotating hammer mill or the like. Preferably, the comminuted particles have a size ranging from −35 mesh to +200 mesh, US standard sieve size.

The ribbon or comminuted powder is degassed and compacted to form a relatively solid billet. Aluminum powders typically require degassing to remove water vapor associated with the oxide layer around the powder. In the present case degassing involves heating the powder under a vacuum preferably better than 10-3 Torr to temperatures in the range of 130 to 400° C. If the powder is heated in the blank die of a vacuum hot press, then it may be compacted, to preferably a density of over 90% theoretical, once it has reached temperature. Alternately, the ribbon or powder may be placed in a can on which a vacuum is pulled while it is heated to the degassing temperature. The can is then sealed and blank die compacted on an extrusion or forging press, or hot isostatically pressed, to produce typically a 100% dense billet.

The billet so produced is completely consolidated and the particles are bonded together by extrusion. A process such as extrusion may be required because the high degree of shear which occurs during extrusion breaks down the tenacious oxide layer between the particles of aluminum, thus allowing interparticle bonding. Secondary operations such as rolling or forging may be used to obtain the material in a usable form such as sheet or a complex shape. Investigations of the properties of the alloy as a function of temperature and speed of deformation indicated that deformation of the alloy should be most formable at high temperatures and low deformations rates, because increasing the strain rate increases the strength of the alloy.

Additional examples of RS aluminum fabrication techniques and composition may be described in U.S. Patent Application Publication No. 20100077825, which is hereby incorporated by reference. Other patent documents incorporated by reference include U.S. Patent Application Publication No. 20090078828; U.S. Pat. Nos. 4,647,321; 4,869,751; 5,296,190; 4,715,893; 4,729,790; and 4,828,632.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A valve unit for an aircraft, comprising:
   a valve assembly;
   a servo controller coupled to the valve assembly and configured to control operation of the valve assembly, wherein at least a portion of at least one of the valve assembly and servo controller is formed by a high temperature aluminum alloy, wherein the valve assembly is configured to modulate a flow of air, the servo controller being configured to at least partially pneumatically control the valve assembly with a portion of the air;

a heat exchanger coupled to the servo controller and the valve assembly, the heat exchanger configured to receive the portion of the air from the valve assembly and to provide the portion of the air to the servo controller, the heat exchanger configured to remove heat from the portion of the air after receiving the portion of the air from the valve assembly and prior to providing the portion of the air to the servo controller, wherein the heat exchanger defines a plurality of passages with a serpentine pattern for removing the heat from the portion of the air, wherein the servo controller has a first side and a second side, opposite to the first side;

at least one first bracket mounting the first side of the servo controller to the valve assembly; and at least one second bracket mounting the second side of the servo controller to the heat exchanger.

2. The valve unit of claim 1, wherein the high temperature aluminum alloy is rapidly solidified aluminum alloy.

3. The valve unit of claim 1, wherein the high temperature aluminum alloy comprises fine silicide dispersoid distributed within an aluminum matrix.

4. The valve unit of claim 1, wherein the heat exchanger is formed by the high temperature aluminum alloy.

5. The valve unit of claim 4, wherein the high temperature aluminum alloy is rapidly solidified aluminum alloy.

6. The valve unit of claim 4, wherein the high temperature aluminum alloy comprises fine silicide dispersoids distributed within an aluminum matrix.

7. The valve unit of claim 1, wherein the valve assembly comprises the high temperature aluminum alloy, and wherein the valve assembly is configured to operate in temperatures of at least 400° F. for at least 10,000 hours without mechanical degradation.

8. The valve unit of claim 1, wherein the valve assembly includes a valve body defining a main flow path and a block defining a plurality of actuation passages and chambers, wherein the valve body and the block are formed with the high temperature aluminum alloy.

9. The valve unit of claim 1, wherein the valve assembly and servo controller are spaced at a predetermined distance apart from each other by the at least one first bracket.

10. The valve unit of claim 9, further comprising a thermal barrier interposed within the predetermined distance between the valve assembly and the servo controller.

* * * * *